United States Patent
Preston et al.

[11] 3,777,197
[45] Dec. 4, 1973

[54] ATTACHMENT ASSEMBLY FOR STATOR WINDINGS

[75] Inventors: Thomas William Preston, Hednesford; Albert Benjamin John Reece, Stafford, both of England

[73] Assignee: The English Electric Company Limited, London, England

[22] Filed: Jan. 3, 1973

[21] Appl. No.: 320,790

[30] Foreign Application Priority Data
Jan. 5, 1972 Great Britain.....................521/72

[52] U.S. Cl. ............................... 310/194, 310/254
[51] Int. Cl. ............................................. H02k 3/46
[58] Field of Search.................... 310/254, 258, 260, 310/194, 179, 180, 214, 215

[56] References Cited
UNITED STATES PATENTS

| | | | |
|---|---|---|---|
| 1,343,221 | 6/1920 | Mills | 310/194 |
| 2,110,686 | 3/1938 | Verrall | 310/254 X |
| 2,130,843 | 9/1938 | Hill et al. | 310/194 |
| 2,903,610 | 9/1959 | Bessiere | 310/254 |
| 2,931,930 | 4/1960 | Hanscom | 310/194 |
| 2,999,176 | 9/1961 | Lindström et al. | 310/194 X |
| 3,609,427 | 9/1971 | Lautner | 310/194 |

Primary Examiner—J. D. Miller
Assistant Examiner—Mark O. Budd
Attorney—Morris Kirschstein et al.

[57] ABSTRACT

A dynamo electric machine which has a stator winding disposed in the rotor-stator air gap. The rotor winding comprises coils having straight axially extending side portions which are supported in trough members which have radially extending side walls the outer ends of which fit into slots in the stator core. The troughs may have cover plates also having side walls extending into the stator slots, and the troughs with the windings therein form a cylindrical structure in the air gap. This structure can be held in position closely adjacent the stator core by conformable packing or wedges associated with the side walls of the troughs and the stator slots.

17 Claims, 8 Drawing Figures

ATTACHMENT ASSEMBLY FOR STATOR WINDINGS

This invention relates to dynamo electric machines having windings in the stator-rotor air gap.

With various types of dynamo electric machine it is advantageous to have the stator winding coils disposed entirely in the stator-rotor air gap instead of in slots in the stator core. This applies especially to large alternating current generators in which it would be advantageous to position the armature windings in the air gap.

However, the armature windings of such a machine are subjected to considerable mechanical force during normal operation and under fault conditions forces acting on the armature windings are greatly increased. The prime consideration in building a large alternating current generator with the armature windings in the air gap is thus one of securing the windings in the air gap so that they will resist mechanical forces tending to distort or destroy them.

According to the present invention there is provided a dynamo electric machine in which the straight sides of the coils of the stator winding are arranged in the rotor-stator air gap, the straight coil sides being disposed in a plurality of axially extending trough members with radially extending side walls the outer ends of which fit into axially extending slots in the stator core, the trough members with the coil sides therein being arranged to form a cylindrical structure within the stator bore.

Each trough member may include a radially outer cover plate fitted over the straight coil sides, between the coil sides and the adjacent face of the stator core.

Each cover plate may include radially extending side walls which fit within the side walls of the trough member and within the slots in the stator core.

According to one arrangement an axially extending cap of channel section is fitted over the ends of adjacent radially extending side walls, each channel section being a good fit within an associated slot in the stator core.

According to a second arrangement an axially extending cap of channel section is fitted over adjacent radially extending side walls for insertion into associated slots in the stator core with conformable packing between the channel sections and the walls of the core slots.

According to a third arrangement one or more of the axial stator slots are wider than the side walls and conformable packing is disposed between the sides of the or each slot and the portions of the side walls within the slots.

The width of the troughs may be such that they can be assembled to form a substantially unbroken continuous cylindrical structure within the stator bore.

Alternatively the troughs may be such that when they are assembled into the stator bore a space is left between at least one pair of side walls of adjacent troughs, packing being inserted into each such space.

Preferably the packing comprises tapered wedges.

One or more of the axially extending slots in the stator core may be so shaped that at least part of the radially outer part of the slot is wider than the mouth of the slot, adjacent side walls extending into the slot being formed to extend circumferentially towards, or into, the wider part of the slot so that the side walls of the troughs can be keyed into the stator slots.

Preferably, pairs of adjacent side walls are of generally overall dovetail shape and fit into slots of a similar cross section.

According to one aspect of the invention the troughs and/or the cover plates thereof are provided with radial and/or axially extending apertures, channels, or ducts for the passage of a cooling medium.

According to a second aspect of the invention the radially outer face of one or more of the cover plates is formed with radially extending ribs so that when the cover plates are in position ducts are provided between at least part of these plates and the inner face of the stator bore for the passage of a cooling medium.

According to a third aspect of the invention wedges or packing members used between troughs are formed with ducts or channels for the passage of a cooling medium.

Alternatively the wedges or packing members are so arranged that such ducts or channels are left between wedges or packing members.

According to a fourth aspect of the invention the troughs are substantially all of the same width.

According to a fifth aspect of the invention at least some of the troughs used to form the cylindrical structure are of different widths from others of the troughs.

According to a sixth aspect of the invention the troughs with the coil sides therein are arranged in a cylindrical structure in which the arcuate distance between one coil side and another, or between groups of coil sides differs around the circumference of the cylindrical structure whereby the complete stator winding can be arranged to give an armature reaction wave and generated e.m.f. of low harmonic contents.

The above described arrangement of the winding may be achieved by having troughs with walls of different thickness, or providing spacers between chosen pairs of adjacent troughs, or inserting wedges of different thicknesses between adjacent pairs of different troughs.

According to a seventh aspect of the invention the stator winding end turns are arranged in the known flared frusto-conical arrangement and the stator core comprises two semi-annular parts secured together after the windings have been secured in the two parts of the stator core.

In a modification of this arrangement the flared portions of the end turns are comparatively short and are at a relatively small angle to the axis of the stator bore, the end turns including straight portions extending from the ends of the flared portions parallel to the axis of the stator bore.

According to an eighth aspect of the invention the radially outer end turns are arranged parallel or substantially parallel to the axis of the stator bore and the radially inner end turns extend radially inwardly towards the axis of the stator bore.

According to a ninth aspect of the invention the stator winding end turn portions associated with the straight sides of the coils in the troughs are flared outwardly in known manner and the cylindrical structure is built up of a number of troughs containing coil sides, the arrangement being such that one end of each trough with the end turn portion can be passed through the rotor bore.

The arrangements of both the eighth and ninth aspects of the invention may be modified to have only short flared portions with straight portions extending from the flared portions parallel to the axis of the stator bore.

According to a tenth aspect of the invention the wedges or packing inserted into at least the lower part of the cylindrical winding structure extend into the air gap to provide supporting surfaces for the rotor whilst the rotor is being inserted into the stator.

Preferably those parts of the wedges or packing extending into the air gap are so constructed that they can be removed after insertion of the rotor into the stator bore.

In an alternative arrangement the wedges or packing between troughs is such as to leave shallow axially extending slots in the face of the lower part of the cylindrical winding structure for locating means on which the rotor may rest when it is being inserted into the stator.

According to a further aspect of the invention the inner face of the stator core is formed with shallow ducts therein for passage of a cooling medium.

A stator winding as described above may be a single layer winding.

Alternatively such stator winding may comprise a multiple layer winding.

A number of embodiments of the invention will now be described, by way of example, with reference to the accompanying drawings in which.

Figure 1:
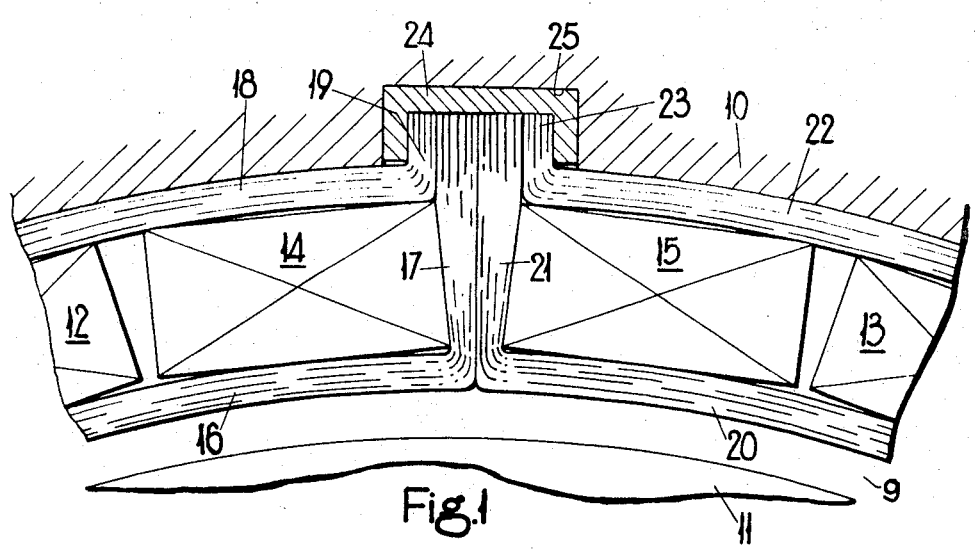
FIG. 1 shows one embodiment of the invention.

FIG. 1 shows part of the stator core 10, part of the rotor core 11 and part of the rotor-stator air gap 9 between the stator and rotor cores of a dynamo electric machine. The stator winding of the machine is disposed in the rotor-stator air gap and is built up of insulated conductor bars two of which are shown in part at 12 and 13 and two in full at 14 and 15. The conductor bars have straight side portions which are the parts shown in FIG. 1 with end turns (not shown). The stator winding conductor bars may be of known construction that is, comprising separate lightly electrically insulated strands which are transposed, and some or all of the strands may be hollow for the passage of a cooling medium, the conductor bar being surrounded by more substantial insulation to withstand coil to coil voltages.

The straight side portions of the conductor bars are accommodated in troughs parts of two of which are shown at 16 and 20. The trough 16 has a radially extending side wall 17, and a cover plate 18 also with a radially extending side wall 19. The trough 20 has a similar side wall with an associated cover plate 22 with a side wall 23. The ends of the four side walls 17, 19, 21 and 22 are covered by a trough-like axially extending cap 24 which fits tightly into an axial slot 25 in the stator core 10.

Any suitable adhesive may be used between the troughs 16 and 20, cap 24 and the core 10, but as far as possible the use of adhesives is avoided so that windings can more easily be replaced.

All parts of the trough cover and cap are of electrically insulating material and the width of each trough depends upon the winding design and the number of conductor bars to be accommodated in a single trough.

The opposite sides of the troughs (not shown) may have side walls which are the same as those shown or they could be of a different construction as, for example, described later in relation to other embodiments.

Figure 2:
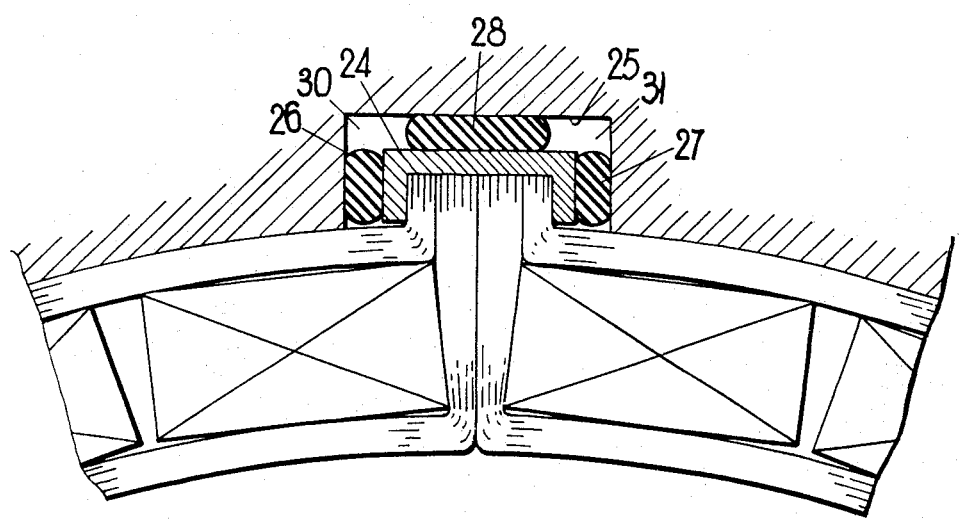
FIG. 2 shows a modification of the FIG. 1 embodiment.

The embodiment of FIG. 2 is similar to that of FIG. 1 excepting that the slot 25 is larger than the cap 24 and packing 26, 27 and 28 is placed between the cap 24, and slot 25. The packing 26, 27 and 28 may comprise any suitable resin impregnated material, the resin being cured when the troughs have been assembled. Alternatively, the packing may comprise flexible bags into which a liquid resin material is pumped, the bags therefore being sealed and the resin cured.

This latter arrangement has the advantage of tightly positioning the troughs within the bore of the stator 10, also spaces 30 and 31 can be left between packing as shown, for the passage of a cooling medium such as a gas.

Figure 3:
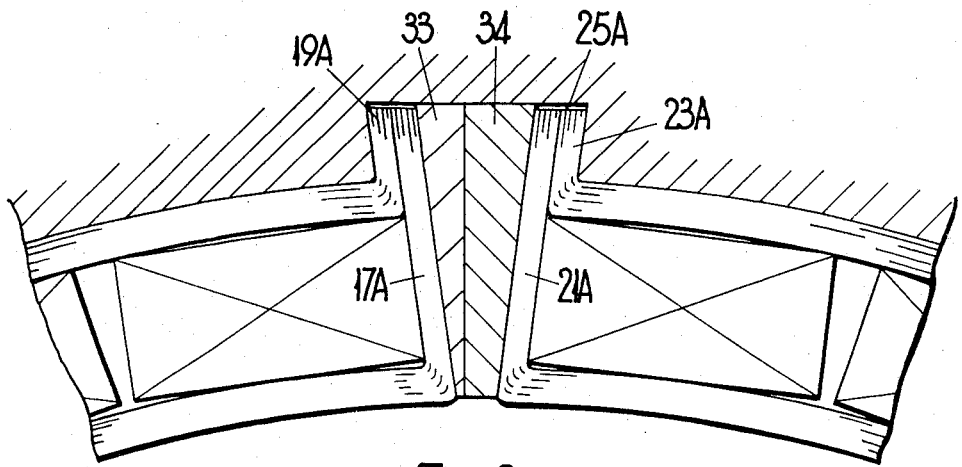
FIG. 3 shows a second embodiment of the invention.
Figure 7:
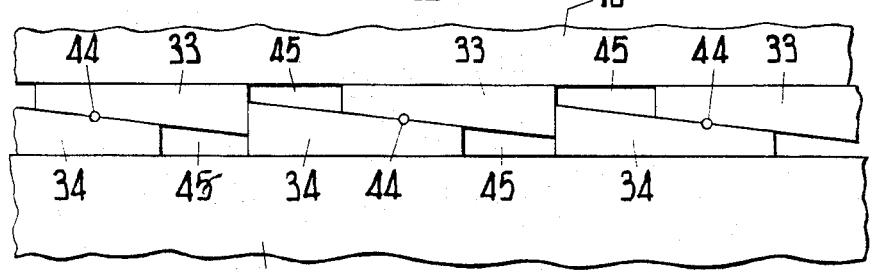

The arrangement of FIG. 3 is similar to that of FIGS. 1 and 2 except that the side walls 17A, 19A, 21A and 23A are at a different angle to the respective parts 16, 18, 20 and 22 so that the side walls have a general overall dovetail outline which fits into a similarly shaped dovetail slot 25A. In this arrangement the troughs are secured within the stator bore by wedges which are tapered both radially and axially. The wedges are preferably inserted radially into the location space and tightened in position to secure the troughs and winding within the stator bore. Each wedge 33 or 34 will normally comprise a number of shorter wedge portions as shown in FIG. 7. This Figure shows pairs of co-operating wedges 33 and 34 in position between trough members 16 and 20. The pairs of co-operating wedges are inserted radially and then driven towards one another. When the pairs of wedges have been fully tightened with one another dowel pins 44 are inserted to prevent axial movement of the wedges. It will be seen that the wedges are of such length that spaces 45 are left between wedges, these spaces can be used for the passage of a cooling medium.

Figure 4:
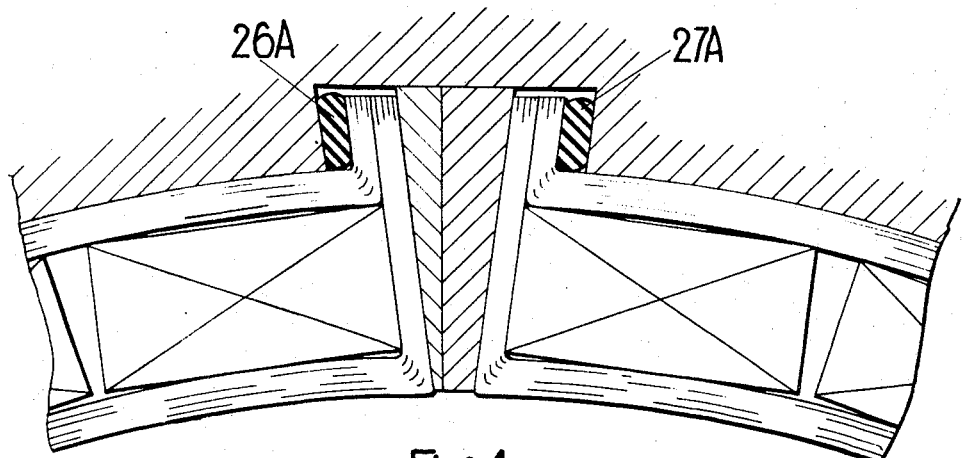
FIG. 4 shows a modification of the FIG. 3 embodiment.

FIG. 4 shows an arrangement similar to that of FIG. 3 but including packing 26A and 27A in the manner of the packing 26 and 27 of FIG. 2.

Figure 5:
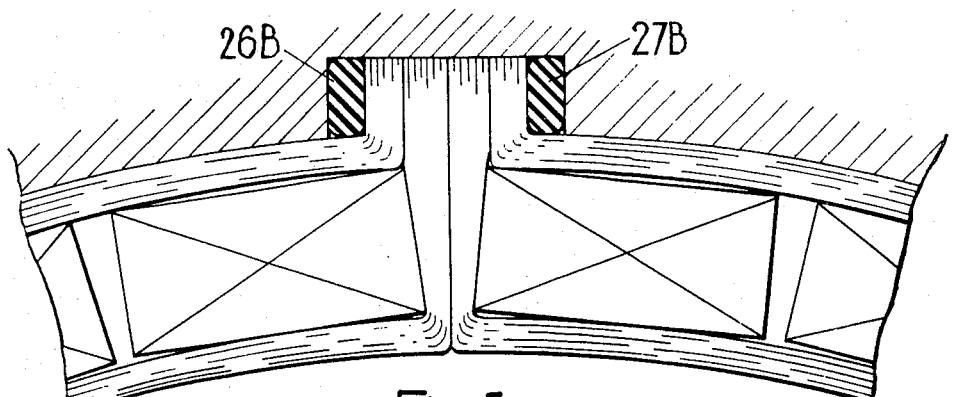
FIG. 5 shows a third embodiment of the invention.

The arrangement of FIG. 5 is similar to that of FIG. 1 except that the cap 24 is not used and packing 26B and 27B used, similar to the packing 26 and 27 of FIG. 2.

Figure 6:
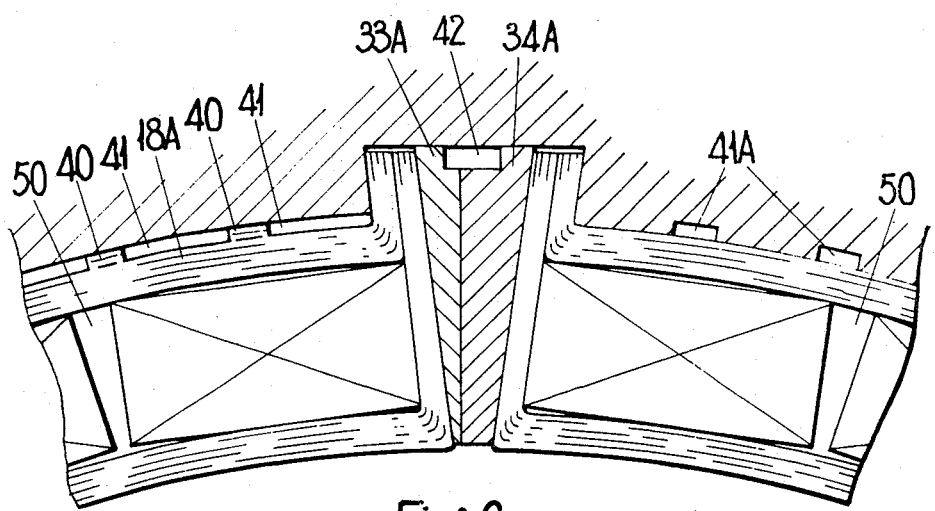
FIGS. 6 and 7 show modifications of the invention which can be used with the arrangements of FIGS. 1 to 5.

FIG. 6 is generally similar to FIG. 3 but is a composite drawing which shows three modifications which may be applied to all embodiments. On the left hand side of FIG. 6 the trough cover 18A is shown with projecting teeth so that spaces 41 are left between the trough cover and the face of the rotor bore. The spaces provide flow paths for a cooling medium, such as a gas, which is caused to flow through ducts or spaces in the stator core. The teeth 40 may extend the whole length of the trough cover or they may extend only over part of the face of the trough cover depending upon the desired flow pattern of the cooling medium. Thus in places the thickness of the cover 18A could be increased to be equal to the thickness of the cover plus the thickness of the teeth 40 so as to provide greater strength and better electrical insulation.

The right hand side of FIG. 6 shows ducts 41A in the face of the stator bore for the passage of a cooling medium and these ducts may extend along the whole length of the stator bore, or they may be provided only in parts of the stator core, for example, at the two ends thereof.

The wedges 33A and 34A of FIG. 5 are shown with cutaway portions which provide a duct 42 for the passage of a cooling medium.

In some machines it is desired to cause a cooling medium flowing through the stator core to flow into the air gap of the machine. Such an arrangement could be provided for by forming radial ducts in the side walls of the troughs, and/or in the wedges where used, or even through the troughs and trough covers.

A further means of providing axial and/or radial ducts would be to use the spaces 50 (FIG. 6) between conductor bars. In order to hold the conductor bars in place the spaces 50 must be filled with packing, but this could be or include packing provided with radial and-/or axial ducts, or the packing could be corrugated to provide such ducts, in any arrangement the trough covers and troughs being provided with holes to align with ducts in the packing.

In the foregoing arrangements the trough covers 18 and 22 could be omitted if the electrical insulation of the conductor bars allowed, or the side walls of the trough cover could be omitted. The conductor bars shown in the drawings are of rectangular cross section but in that they are usually shaped in a mould they could be made arcuate so as to follow the contours of the troughs and covers. Alternatively some form of packing would be required between the flat surfaces of the conductor bars and the arcuate surfaces of the troughs and covers.

Further, the troughs described can conveniently be made of any suitable electrical insulating material used to make the best use of its mechanical strength in a given direction and mica-glass laminates are considered one of the more favourable materials for the manufacture of the troughs.

The stator winding of a dynamo electric machine comprises coils having two straight side portions which lie approximately 180° apart and these side portions are joined by end turns. At one end the straight sides are joined together and at the other ends, except terminal ends, they are joined to coil side of the next adjacent turn of a coil. In order to achieve this end turn arrangement the end turns are normally arranged in a frusto-conical arrangement which is flared outwardly at the ends of the stator core and since the end turns must pass over one another a single layer winding as described becomes a double layer arrangement at the end turns with an inner and outer cone of layers of end turns. With a double layer winding, which could be used with the present invention the end turns would be arranged in four concentric cones of layers of conductor bars.

With the flared out end turns it would not always be possible to construct a winding which could be threaded through the stator bore and one solution to this problem would be to build the whole stator, with windings, in two semi-annular parts which are later joined together.

Figure 8:
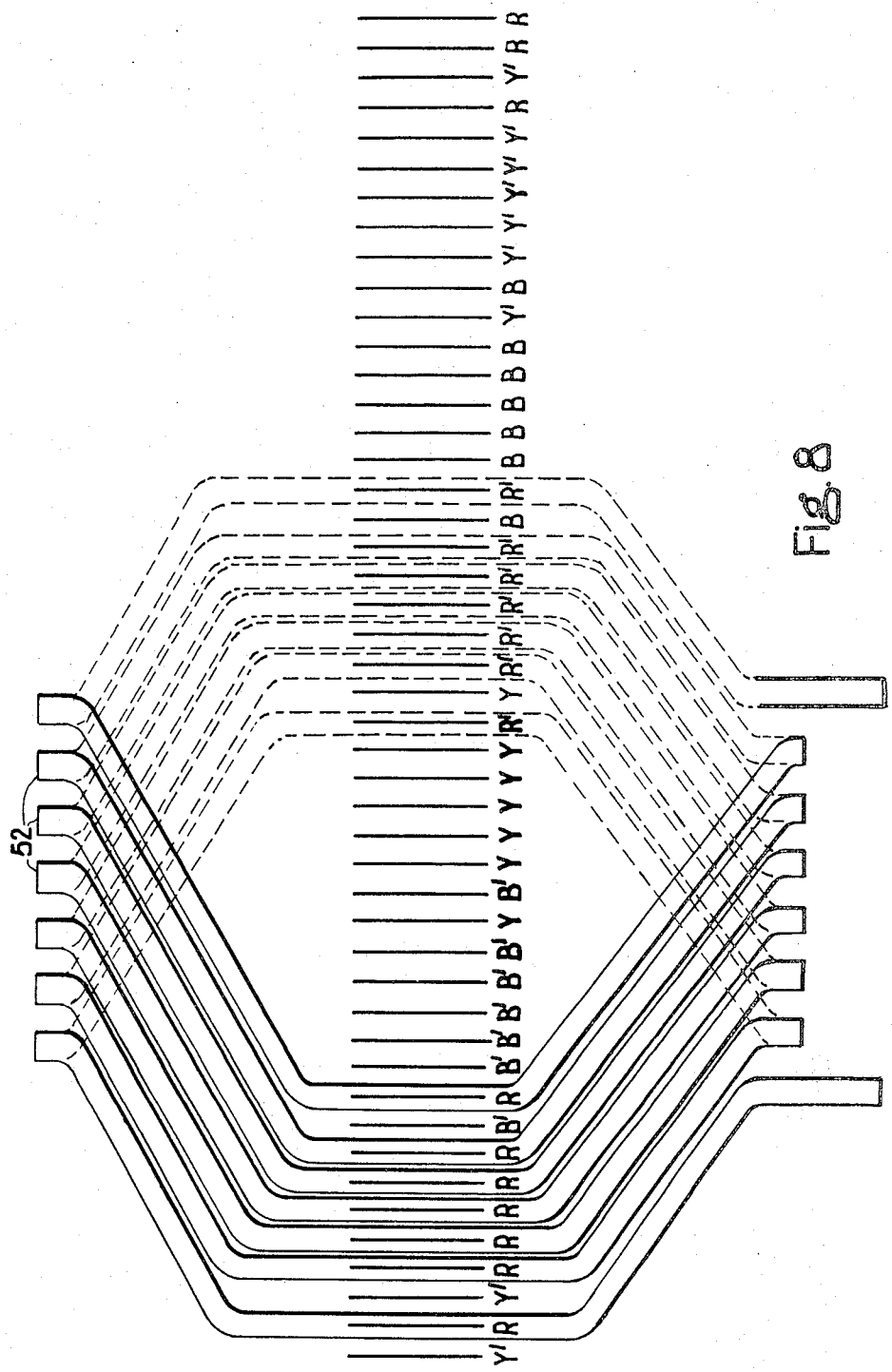
FIG. 8 shows one winding arrangement which can be used with the embodiment of FIGS. 1 to 7.

However, if all coil sides of a phase winding in one trough go into one layer and providing the trough does not contain too many coil sides then it is possible to make a winding according to the present invention in which the coil sides with end turn portions can be passed through the stator bore. One such winding layout is shown in FIG. 8 in which the conventional R, Y and B references indicate the red, yellow and blue phases of a three-phase winding. It will be seen that this winding is a 1 - 5 - 1 interspersed winding, that is a total of seven coil sides per phase are arranged, one $Y^1$, five R, one $B^1$, one R, five $B^1$, one Y, one $B^1$ etc. This winding is arranged in troughs containing one, three, two and one straight coil sides and the seven end turns of each phase winding go into a single layer.

The most convenient winding to use from the manufacturing point of view may not be the best from the electrical aspect in that the harmonic content of the stator armature reaction wave and generated e.m.f. may be greater than desired. However, improvement can be obtained by adjusting the circumferential spacing of the conductor bars and thus the wedges of for example FIGS. 3, 4 and 6 can be chosen to be of a desired width to give a desired spacing. Alternatively spacers could be used between the trough side of the arrangements of FIGS. 1, 2 and 5. Since the sides of the troughs act as insulating barriers between the phase windings, the thickness can be chosen to give the desired degree of electrical isolation between phases.

In another end winding arrangement, where the air gap allows, the radially outer layer of end turns either extends straight out from the rotor body, or are bent so that they extend radially outwards from the stator bore at a small angle, the inner layer of end turns extend radially inwards. However, such arrangements would probably require longer end turns so as to clear the rotor with its end winding retaining rings and thus increase the length of the machine. A modification of the above described arrangement is for the end turns to be formed with only short portions which extend radially and longer portions which then extend parallel to the axis of the stator bore. Such an arrangement can be used with end turns which extend radially outwards for a short distance and have further portions which extend parallel to the axis of the stator bore.

The wedges, or where used, spacers between troughs may be made to extend into the machine air gap in the lower part of the stator bore so as to provide a support surface for the rotor when it is inserted into the stator bore. However, it would be desirable to be able to remove the projecting portions so that they do not increase windage losses. An alternative arrangement would be to use spacers or wedges which left shallow ducts between trough sides, these shallow ducts acting to locate and hold in position means on which the rotor could rest, this means being later withdrawn axially from the air gap either whole or broken into pieces as it is withdrawn.

We claim:

1. A dynamo electric machine having a rotor core and a stator core separated by an annular rotor-stator air gap and including a stator winding comprising coils which have straight side portions, the straight side portions of the coils being disposed within the rotor-stator air gap supported in a plurality of axially extending trough members which have radially extending side walls the outer ends of which fit into axially extending slots provided in the stator core, the trough members with the straight coil side portions therein forming a cylindrical structure within the rotor-stator air gap adjacent the stator core and spaced from the surface of the rotor core.

2. A machine according to claim 1 in which each trough member includes a radially outer cover plate fitted over the straight coil sides, between the coil sides and the adjacent face of the stator core.

3. A machine according to claim 2 in which each cover plate includes radially extending side walls which fit within the side walls of the trough member and also extend into the slots in the stator core.

4. A machine according to claim 3 including an axially extending cap of channel section fitted over the ends of adjacent radially extending side walls, each channel section being a good fit within an associated slot in the stator core.

5. A machine according to claim 3 including an axially extending cap of channel section fitted over adjacent radially extending side walls for insertion into associated slots in the stator core with conformable packing members between the channel sections and the walls of the stator core slots.

6. A machine according to claim 1 wherein the width of the troughs is such that they can be assembled to form a substantially unbroken continuous cylindrical structure within the stator bore.

7. A machine according to claim 1 wherein the width of the troughs is such that when they are assembled into the stator bore a space is left between at least one pair of side walls of adjacent troughs, and including packing inserted into the or each such space.

8. A machine according to claim 7 in which the packing comprises tapered wedges.

9. A machine according to claim 2 in which one or more of the axially extending slots in the stator core are so shaped that at least part of the radially outer part of the slot is wider than the mouth of the slot, adjacent side walls extending into such slot having portions which extend circumferentially into the wider part of the slot so that said side walls can be keyed into the stator slots.

10. A machine according to claim 9 in which pairs of adjacent side walls are of generally overall dovetail shape and fit into slots of the same cross section.

11. A machine according to claim 2 in which the troughs and the cover plates are formed with ducts for the passage of a cooling medium.

12. A machine according to claim 2 in which the radially outer face of one or more of the cover plates is formed with radially extending ribs so that when the cover plates are in position ducts are provided between at least part of these plates and the inner face of the stator core for the passage of a cooling medium.

13. A machine according to claim 5 in which the conformable packing members used between troughs are so arranged as to leave axially extending ducts for the passage of a cooling medium.

14. A machine according to claim 7 in which the packing is so arranged as to leave axially extending ducts for the passage of a cooling medium.

15. A machine according to claim 1 in which the troughs are substantially all of the same width.

16. A machine according to claim 1 in which at least some of the troughs used to form the cylindrical structure are of different widths from others of the troughs.

17. A machine according to claim 1 in which troughs with the coil sides therein are arranged in a cylindrical structure in which the arcuate distance between one coil side and another, or between groups of coil sides differs around the circumference of the cylindrical structure whereby the complete stator winding can be arranged to give an armature reaction wave and generated e.m.f. of low harmonic contents.

* * * * *